US012607278B2

(12) United States Patent
Velusamy et al.

(10) Patent No.: US 12,607,278 B2
(45) Date of Patent: Apr. 21, 2026

(54) USING PRESSURE TO MONITOR POSITION OF COMPONENTS ON A CONTROL VALVE

(71) Applicant: Dresser, LLC, Houston, TX (US)

(72) Inventors: Manojkumar Velusamy, Coimbatore (IN); Jayaganesh Nataraj, Coimbatore (IN)

(73) Assignee: Dresser, LLC, Houston, TX (US)

( * ) Notice: Subject to any disclaimer, the term of this patent is extended or adjusted under 35 U.S.C. 154(b) by 99 days.

(21) Appl. No.: 18/522,595

(22) Filed: Nov. 29, 2023

(65) Prior Publication Data

US 2025/0172221 A1 May 29, 2025

(51) Int. Cl.
F16K 37/00 (2006.01)

(52) U.S. Cl.
CPC ................................. F16K 37/0066 (2013.01)

(58) Field of Classification Search
CPC ......... Y10T 137/8225; Y10T 137/8326; F16K 37/0066; F16K 37/0041
See application file for complete search history.

(56) References Cited

U.S. PATENT DOCUMENTS

| | | | | | |
|---|---|---|---|---|---|
| 2,888,029 | A | * | 5/1959 | Govan | F16K 31/124 137/553 |
| 4,976,144 | A | | 12/1990 | Fitzgerald | |
| 6,131,609 | A | | 10/2000 | Metso et al. | |
| 6,382,226 | B1 | * | 5/2002 | Larson | F16K 37/0041 137/554 |
| 2002/0092863 | A1 | * | 7/2002 | Tofino | F16K 37/0066 222/1 |
| 2008/0121290 | A1 | * | 5/2008 | Pape | G01N 29/14 137/551 |
| 2014/0041861 | A1 | * | 2/2014 | Nicholson | F16K 37/0016 166/97.1 |
| 2015/0167700 | A1 | * | 6/2015 | Shelcoviz | F15B 15/2838 92/162 R |
| 2023/0349486 | A1 | | 11/2023 | Smart | |

FOREIGN PATENT DOCUMENTS

| | | | |
|---|---|---|---|
| DE | 1115090 B | * | 10/1961 |
| DE | 1213309 B | * | 3/1966 |
| DE | 2419497 A1 | * | 11/1975 |

OTHER PUBLICATIONS

Translation of DE1115090 retrieved from espacenet.com Jul. 30, 2025 (Year: 2025).*
Translation of DE1213309 retrieved from espacenet.com Jul. 30, 2025 (Year: 2025).*

* cited by examiner

*Primary Examiner* — Jessica Cahill
(74) *Attorney, Agent, or Firm* — Paul Frank + Collins P.C.

(57) ABSTRACT

A position monitoring system is configured for use on control valves and other flow controls. These configurations include a motion sensitive unit, for example, a flexible tube with one end that can move in conjunction with a valve stem on the flow control. The flexible tube may hold synthetic oil. Another end of the tube may couple with a pressure senor. In use, this senor may generate a signal that corresponds with head pressure of the synthetic oil in the tube. Operating hardware on the flow control, for example, processing hardware that is part of a valve positioner or controller, may process the signal from the pressure sensor to identify a operating condition of a valve, for example, a position for a closure member of the valve.

20 Claims, 7 Drawing Sheets

USING PRESSURE TO MONITOR POSITION OF COMPONENTS ON A CONTROL VALVE

BACKGROUND

Flow controls play a significant role in many industrial settings. Power plants and industrial process facilities, for example, use different types of flow controls to manage flow of material, typically fluids, throughout vast networks of pipes, tanks, generators, and other equipment. Control valves are a type of flow control that operators favor to regulate flow of material on their process lines. These devices may employ various systems to precisely monitor a position of certain parts to maintain flow within limits that meet process parameters. Examples of these systems include mechanical linkages or other mechanical devices that trigger optical or magnetic sensors. Trends in the industry, however, tend to disfavor linkages because they can add costs and complexity to the overall device. The mechanisms are also sensitive to vibrations that prevail in industrial settings.

SUMMARY

The subject matter of this disclosure relates to improvements to monitor position on control valves and flow controls, in general. Of particular interest are embodiments that use pressure-based devices to monitor position of parts on the flow control. These embodiments may forego conventional mechanical linkages, in lieu of use of "head pressure" in a fluid column. This type of feedback may benefit the design because it is much less susceptible to ambient conditions that flow controls may see in the field, including vibrations that are found in many industrial settings.

DRAWINGS

This specification refers to the following drawings:

FIG. 1 depicts a schematic diagram of an exemplary embodiment of a position monitoring system 100;

Figures 2, 6:
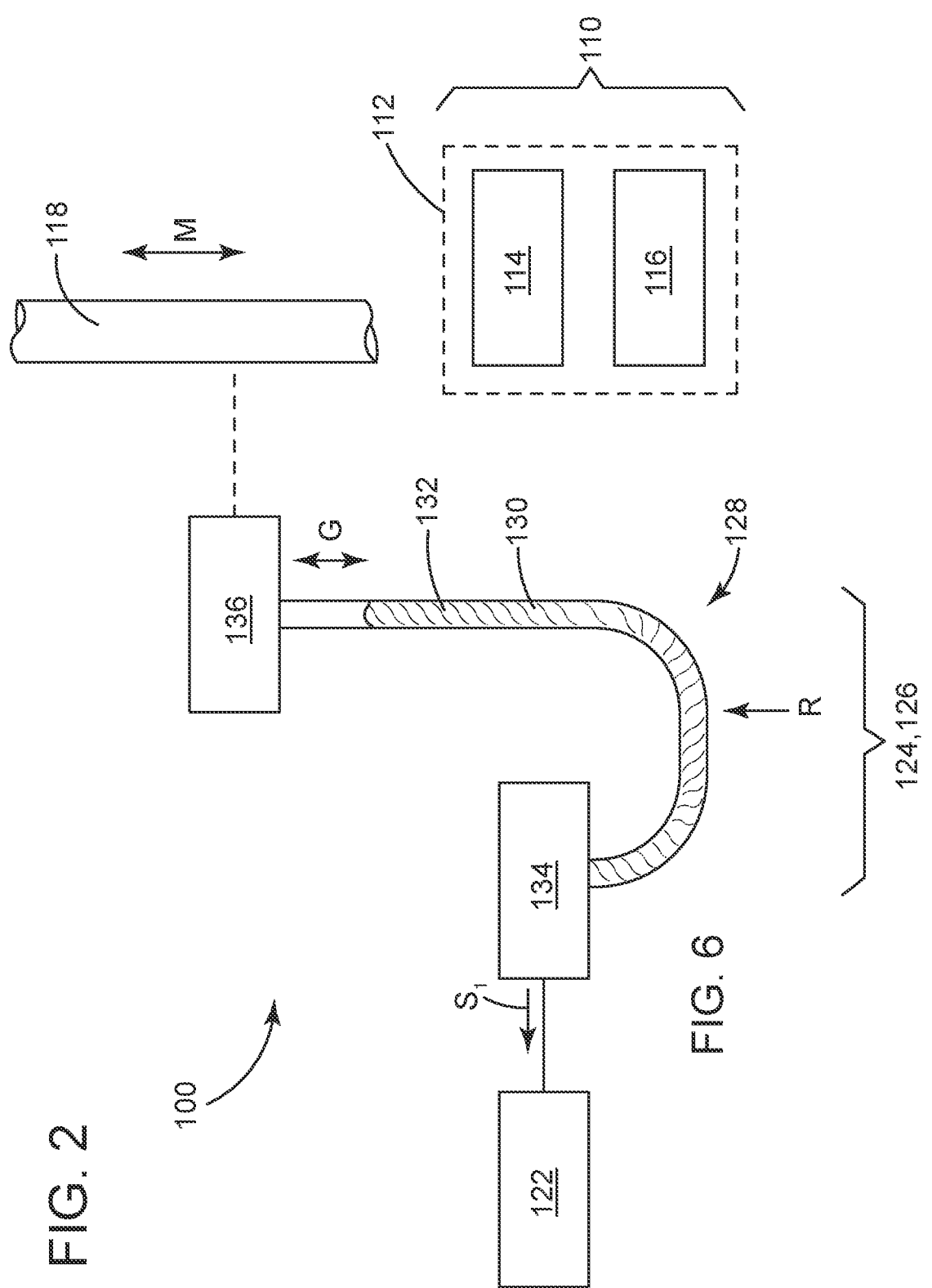
FIG. 2 depicts a schematic diagram of an example of the position monitoring system of FIG. 1.
FIG. 6 depicts an elevation view from the side of the flow control of FIG. 4.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the examples shown in drawings noted above. These features obviate the need for certain mechanical linkages that may provide feedback to control setpoint on control valves and like flow controls. These linkages are susceptible to inaccuracies, often due to vibrations that prevail in industrial settings where flow controls are found in the field. The proposed designs herein, on the other hand, leverage "mechanic-less" modalities to measure or monitor position of critical parts on the device. These modalities may result in more accurate data that operators can rely upon to manage process parameters on their networks. Other embodiments may be within the scope of this disclosure.

Figure 1:
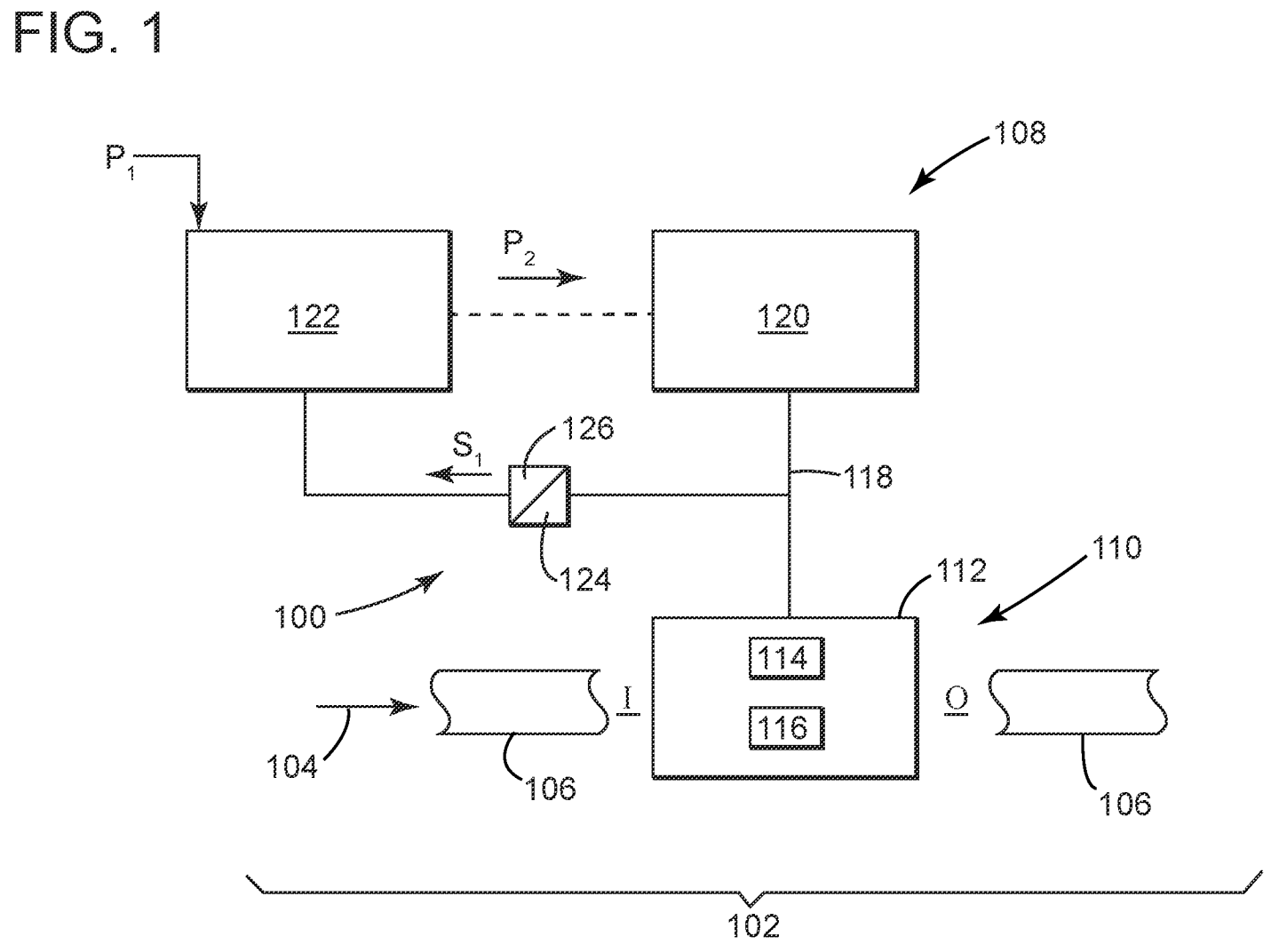

FIG. 1 depicts an example of a position monitoring system 100. This example is found in a distribution network 102, typically designed to carry material 104 through a network of conduit 106. The position monitoring system 100 may connect with a flow control 108 that is part of the network 102. The flow control 108 may have a valve 110 with a valve body 112. Inside of the valve body 112 may reside a closure member 114 and a seat 116. A valve stem 118 may couple the closure member 114 with an actuator 120. A controller 122 may couple with the actuator 120. In one implementation, the position monitoring system 100 may include a motion sensitive unit 124 that couples with the valve stem 118. A sensor unit 126 may couple with the motion sensitive unit 124 and the controller 122.

Broadly, the position monitoring system 100 may be configured to maintain flow of fluids to meet process parameters. These configurations may incorporate devices that do not require moving parts, like linkages, to measure position or location of parts on valves or like flow controls. These devices may instead utilize fluid properties or parameters, like pressure, to generate accurate data that corresponds with operating conditions on the flow controls. This feature is useful because it simplifies construction of the overall assembly, which can lower manufacturing, labor, and maintenances costs and potentially lead to more accurate operation of the flow control to meet process parameters.

The distribution system 102 may be configured to deliver or move these fluids. These configurations may embody vast infrastructure. Material 104 may comprise gases, liquids, solid-liquid mixes, or liquid-gas mixes, as well. The conduit 106 may include pipes or pipelines that often connect to pumps, boilers, and the like. The pipes 106 may also connect to tanks or reservoirs. In many facilities, this equipment forms complex networks to execute a process, like refining raw materials or manufacturing an end product.

The flow control 108 may be configured to regulate flow of material 104 through the conduit 106 in these complex networks. These configurations may include control valves and like devices. The valve body 112 in such devices is often made of cast or machined metals. This structure may form a flange at the openings I, O. Adjacent pipes 106 may connect to these flanges to allow material 104 to flow through the device, for example, through an opening in the seat 116. The closure member 114 may embody a disc or "plug." The valve stem 118 may embody an elongate cylinder or rod that connects on one end to this plug. The other end of this rod may couple with the actuator 120. In one implementation, the actuator 120 may include a piston and a spring (or springs) that together generate a load on the valve stem 118. It is not uncommon, though, that a flexible diaphragm may take the place of the piston in some designs. In use, the load regulates the position of the closure member 114, which in turn manages flow of material 104 through the seat 116 and into the pipes 106 downstream of the device.

The controller 122 may be configured to process and generate signals. These configurations may connect to a control network (or "distributed control system" or "DCS"). This network may maintain operation of all devices on process lines to ensure that materials flow in accordance with a process or meets certain process parameters. The DCS may generate control signals with operating parameters that describe or define operation of the flow control 108 for this purpose. Operating hardware in the controller 122 may employ electrical and computing components (e.g., processors, memory, executable instructions, etc.). These components may also include electro-pneumatic devices that operate on incoming pneumatic supply signal $P_1$. These components ensure that the outgoing actuator control signal $P_2$ to the actuator 120 is appropriate for the flow control 108 to supply material 104 downstream according to process parameters.

The motion sensitive unit 124 may be configured to provide feedback that corresponds with position of the closure member 114. These configurations may include devices with few, if any, moving parts. These devices may instead utilize non-contact modalities or similar "mechanicless" techniques. In one implementation, these techniques can associate head pressure of a fluid column to a location or position of the closure member 114.

The sensor unit 126 may be configured to generate data that corresponds with this head pressure. These configurations may include sensors that are sensitive to small pressure changes, for example, on a scale of mmWC/mbar. These sensors may generate a signal $S_1$ that corresponds with a pressure value. The operating hardware in the controller 122 may, in turn, process this signal to generate data that identifies a position for the closure member 114. In one implementation, the operating hardware may account for ambient conditions around the device. These conditions may include ambient temperature or ambient pressure, variations of which can impact parts of the motion sensitive unit 124.

FIG. 2 depicts a schematic diagram for an example of the position monitoring system 100 of FIG. 1. The units 124, 126 may include a conduit 128, for example, a tube 130 made of flexible rubber, plastic, or other materials that can meet certain design requirements, like bend radius R or diameter (e.g., from 4 mm to 12 mm). The tube 130 may contain fluid 132, like synthetic oil or like compounds with similar properties; however, this disclosure contemplates that fluid 132 may comprise materials or compositions that have various density, viscosity, or other properties. The fluid 132 may not fill the interior of the tube 130, leaving an air gap G. As also shown, a first end of the tube 130 may couple with a pressure sensor 134, like the "ultra-low range pressure" sensors discussed herein. A coupler 136 may couple a second end of the tube 130 with the valve stem 118. This feature may cause the second end of the tube 130 to move concomitantly with the valve stem 118. Designs for the coupler 136 may include materials or devices to isolate or damp vibrations on the tube 130, as well. The design may benefit from use of braided connections or quick-connect plumbing connections on the sensor 134 or the coupler 136 to facilitate assembly and use on industrial valves.

The arrangement of the position monitoring system 100 in FIG. 2 can provide accurate feedback as to the operating condition of the valve 110 (FIG. 1). In one implementation, the "ultra-low range pressure sensor" 134 may generate the signal $S_1$ that defines a value for head pressure in the column of fluid 132 in the tube 130. The signal $S_1$ may change in response to a change in position of the second end of the flexible tube 130, which might occur in response to movement M of the valve stem 118, for example, up or down as necessary to set a position for the closure member 114 relative to the seat 116 to achieve the setpoint for the flow control 108. The controller 122 can process the signal $S_1$ to generate a value for the position of the closure member 114 or other indicator (for example, "percent open" or "% open") for the operating condition(s) of the valve 110.

Figure 3:
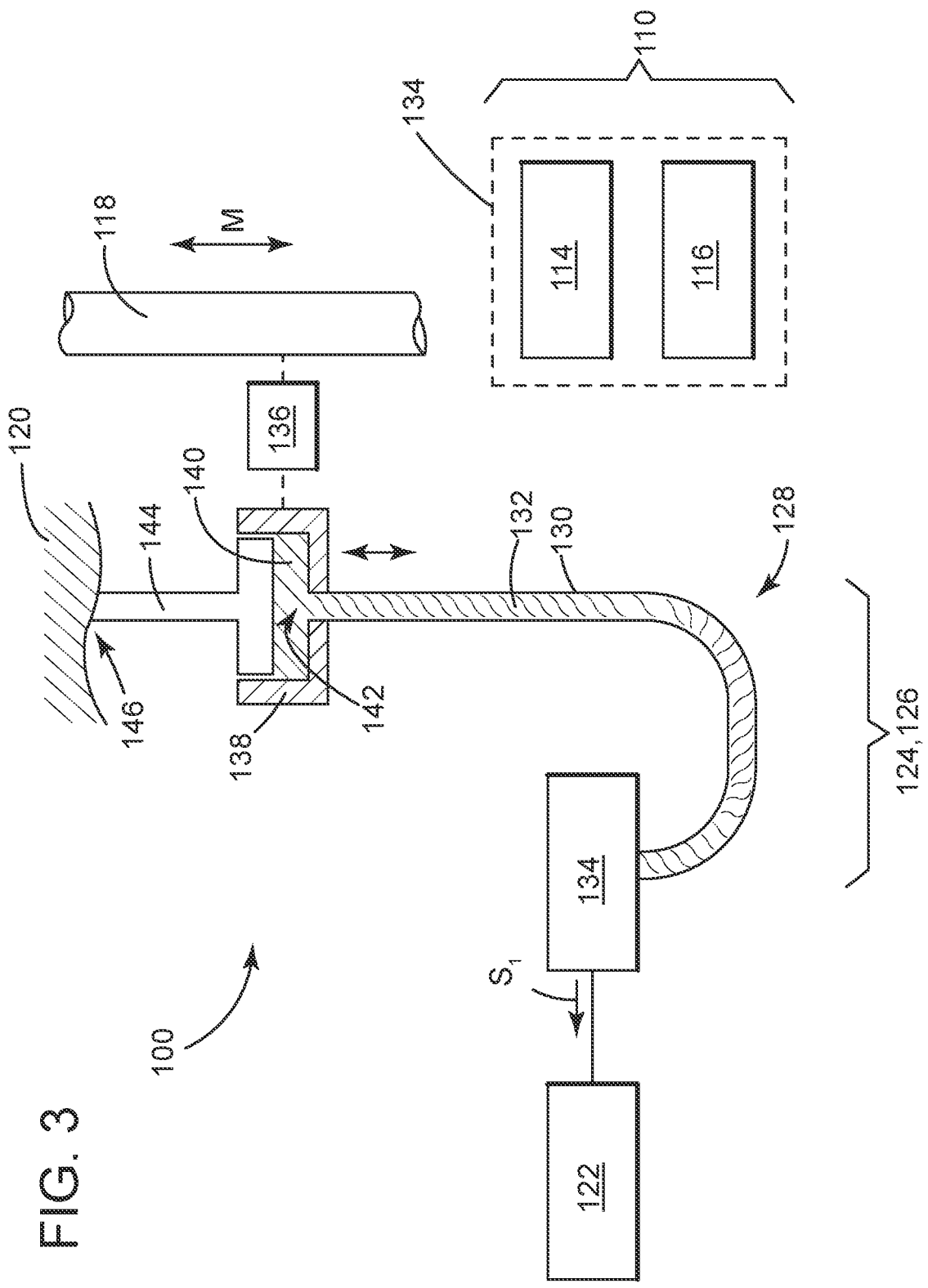
FIG. 3 depicts a schematic diagram of an example of the positioning monitoring system of FIG. 1.

FIG. 3 depicts a schematic diagram of another example of the position monitoring system 100 of FIG. 1. The coupler 136 may secure a cylinder 138 to the valve stem 118. The cylinder 138 may form a reservoir 140 with an opening 142. As shown, the second end of the tube 130 may couple with the cylinder 138 at the opening 142, for example, at a protrusion or other feature that can receive the tube 130. Fasteners, like clips or fittings, may prevail for this purpose. The arrangement of the tube 130 at the opening 142 permits fluid 132 to fill the tube 130 in its entirety, with excess fluid resident the reservoir 140. In one implementation, a piston 144 may fit inside of the cylinder 138. The piston 144 may have a fixed end 146, shown here attached to the actuator 120.

The arrangement of the position monitoring system 100 in FIG. 3 can provide accurate feedback as to the operating condition of the valve 110 (FIG. 1). In one implementation, the cylinder 138 may move concomitantly with the valve stem 118 and, in turn, relative to the piston 144. This feature may increase or decrease pressure that the piston 144 applies to the fluid 132 in the reservoir 140. As noted above, the "ultra-low range pressure sensor" 134 may generate the signal $S_1$ to correspond with the pressure value for the column of fluid 132 in the tube 130. The controller 122 can process the signal $S_1$ to generate the value for the position of the closure member 114 or other indicator (for example, "percent open" or "% open") for the operating condition(s) of the valve 110.

Figure 4:
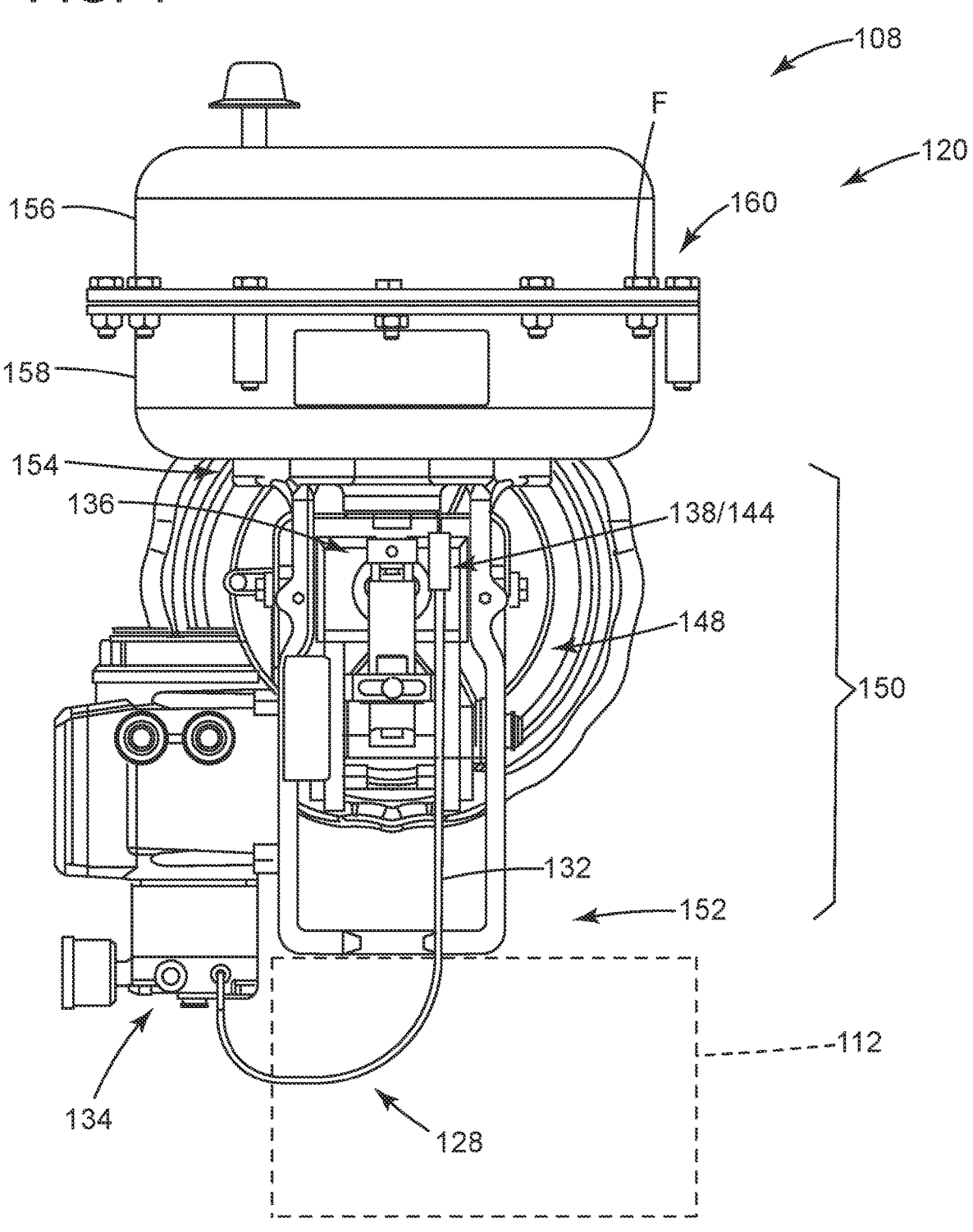
FIG. 4 depicts an elevation view from the front of an example of a flow control for use with the position monitoring system of FIG. 1.
Figure 5:
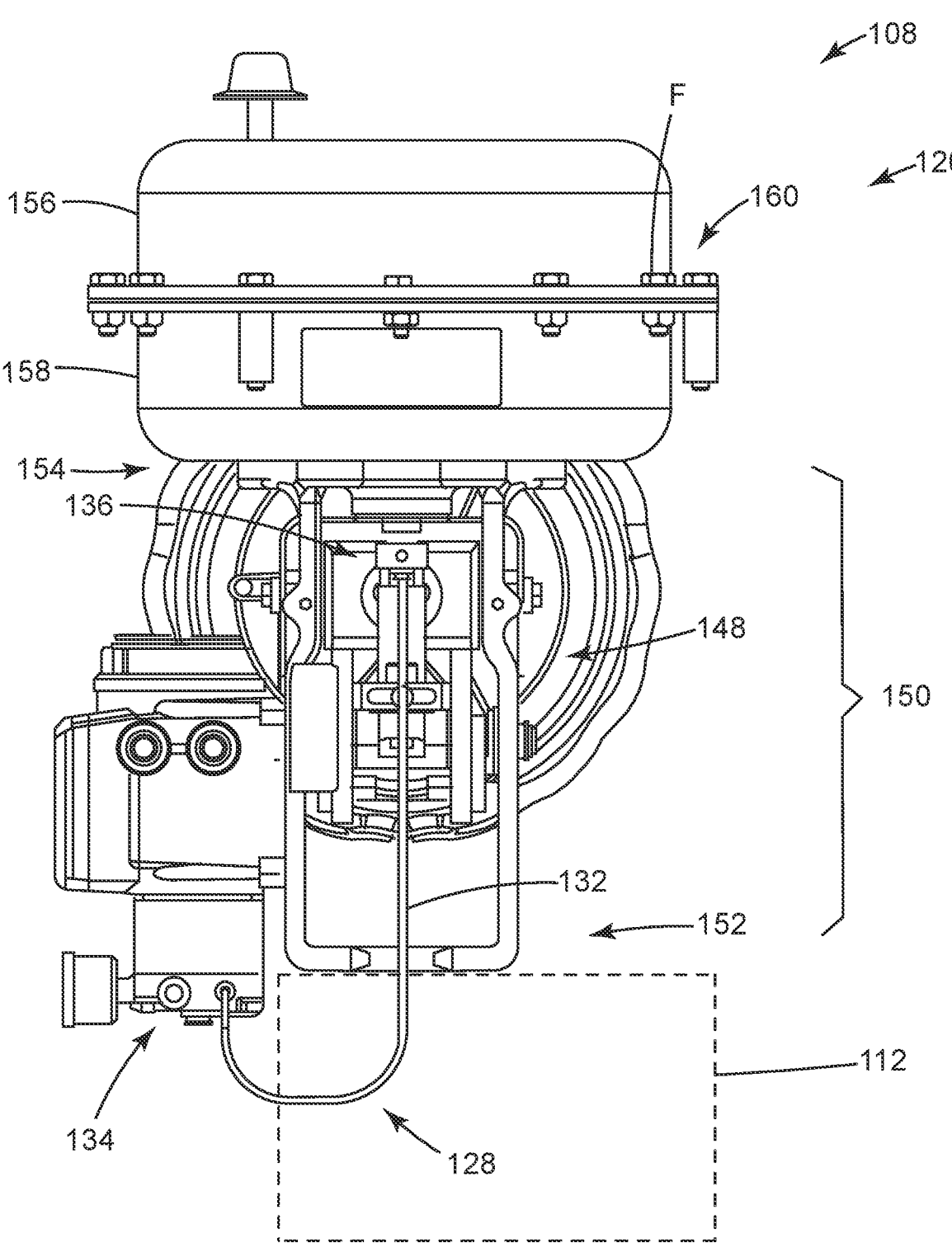
FIG. 5 depicts an elevation view from the front of an example of the flow control of FIG. 4.

FIGS. 4 and 5 depict an elevation view from the front of exemplary structure for the flow control 108. This structure may include a superstructure 148 that forms a yoke 150 with a first end 152 that attaches to the valve body 112. A second end 154 of the yoke 150 may support the actuator 120, shown here to have an upper casing 156 and a lower casing 158. The casings 156, 158 may secure to one another about a peripheral flange 160. Fasteners F (like nuts and bolts) may find use to tighten the flanges 160 of the casings 156, 158 to form a sealed, air-tight enclosure. The example of FIG. 4 also includes an example of the coupler arrangement of FIG. 2 for the position monitoring system 100. FIG. 5 provides an example of the piston/cylinder arrangement of FIG. 3 for the position monitoring system 100 in position on the structure of the flow control 108.

FIG. 6 depicts an elevation view from the side of the exemplary flow control 108 of FIGS. 4 and 5. A manual device 162, like a wheel or lever, may attach to the yoke 150. This device can allow an end user to manually move the closure member 114, as desired. In one implementation, the controller 100 (FIG. 1. 2, 3) may embody a valve positioner 164 that attaches to the yoke 150. The valve positioner 164 may have a housing 166 to contain or enclose its operating hardware or other working components therein. The housing 166 may adopt designs that are explosion-proof or, at least, meet certain intrinsic safety requirements. In one implementation, the pressure sensor 134 may reside on the outside of the housing 166, for example, as a separate unit that attaches to the housing 166 or to the yoke 148. However, in other implementations, the sensor 134 may reside inside of the housing 166.

Figure 7:
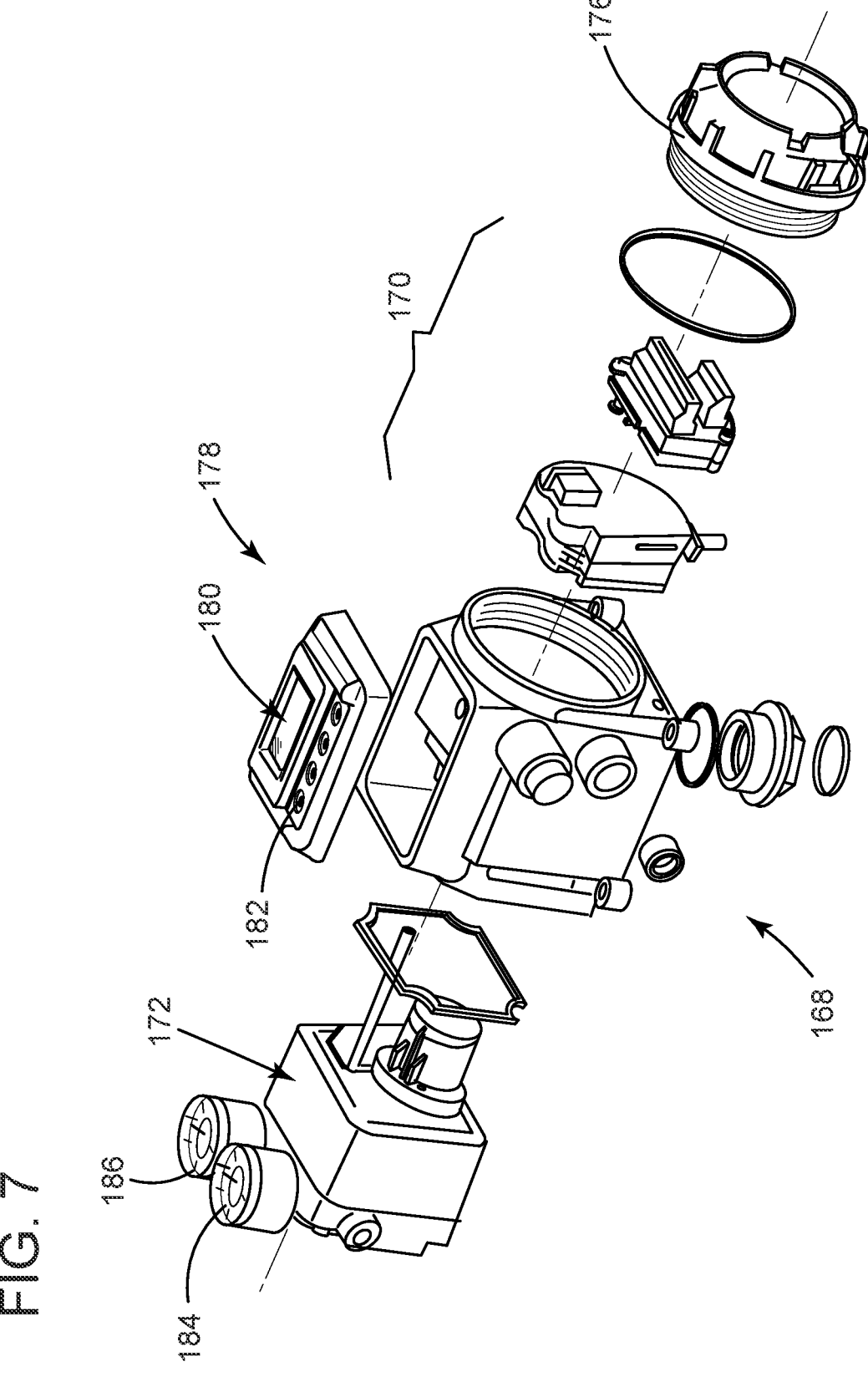
FIG. 7 depicts a perspective view of an example of a valve positioner for use with the position monitoring system of FIG. 1.

FIG. 7 depicts a perspective view of exemplary structure for the valve positioner 164 in exploded form. This structure may include a manifold having a manifold body 168, typically machined or formed metal, plastic or composite. The device may include one or more boards 170 with processing hardware disposed thereon. Other hardware may include a pneumatic module 172, which may include a current-to-pressure converter and a relay. These devices may generate the actuator control signal $P_2$ that the valve positioner 164 delivers to the actuator 120 (FIG. 1). As also shown, the housing 166 may include covers 176, 178 in this example. The cover 176 may secure to the manifold body 168 to protect the control components, including boards 170, from conditions that prevail in the environment surrounding the flow control 108. The cover 178 may incorporate a display 180 and a pushbutton input device 182 that may operate as the primary local user interface to allow an end user (e.g., technician) to interact with the valve positioner 164. This feature may be important for regular maintenance, configuration, and setup, for example, to allow the end user to exit from valve operating mode and step through a menu structure to manually perform functions such as calibration, configuration, and monitoring. In one implementation, the structure may further include one or more gauges 184, 186 that can provide an indication of the flow conditions (e.g., pressure, flow rate, etc.) of the fluid that the valve positioner 164 uses to operate the flow control 108.

This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A control valve, comprising:
an actuator;
a valve stem coupled with the actuator;
a closure member coupled with the valve stem;
a position monitoring system coupled with the closure member, the position monitoring system configured to generate a signal in response to head pressure of a fluid, the signal corresponding with a position for the closure member;
wherein the position monitoring system comprises:
a tube that contains the fluid, the tube configured with a first end and a second end,
a cylinder coupled with the first end of the tube, the cylinder configured with a reservoir that contains the fluid and is configured to move concomitantly with the valve stem, and
a piston having an end disposed in the cylinder and in contact with the fluid, the piston configured to remain stationary relative to movement of the cylinder.

2. The control valve of claim 1, wherein the position monitoring system comprises:
a pressure sensor configured to generate the signal.

3. The control valve of claim 1, wherein the position monitoring system comprises a pressure sensor that is sensitive to pressure changes on a scale of mmWC/mbar.

4. The control valve of claim 1, further comprising:
a sensor coupled with the second end of the tube; and
a controller with operating hardware coupled with the sensor, the operating hardware configured to process the signal to generate a value for an operating condition of the valve.

5. The control valve of claim 1, further comprising:
a sensor coupled with the second end of the tube; and
a controller with operating hardware coupled with the sensor, the operating hardware configured to process the signal to generate a value for an operating condition of the valve,
wherein the value accounts for conditions around the sensor.

6. The control valve of claim 1, further comprising:
a sensor coupled with the second end of the tube; and
a controller with operating hardware coupled with the sensor, the operating hardware configured to process the signal to generate a value for an operating condition of the valve,
wherein the value accounts for ambient temperature.

7. The control valve of claim 1, further comprising:
a sensor coupled with the second end of the tube; and
a controller with operating hardware coupled with the pressure sensor, the operating hardware configured to process the signal to generate a value for an operating condition of the valve,
wherein the value accounts ambient pressure.

8. The control valve of claim 1, further comprising:
a sensor coupled with the second end of the tube,
wherein the tube bends at a lower portion proximate the second end.

9. The control valve of claim 1, further comprising:
a sensor coupled with the second end of the tube,
wherein the tube is flexible to accommodate a bend radius proximate the second end.

10. The control valve of claim 1, wherein the fluid comprises synthetic oil.

11. A control valve, comprising:
an actuator;
a valve stem coupled with the actuator;
a closure member coupled with the valve stem;
a position monitoring system coupled with the closure member, the position monitoring system configured to generate a signal in response to head pressure of a fluid, the signal corresponding with a position for the closure member;
wherein the position monitoring system comprises:
a tube that contains the fluid, the tube configured with a first end and a second end,
a cylinder coupled with the first end of the tube, the cylinder configured with a reservoir that contains the fluid and configured to move concomitantly with the valve stem, and
a piston having a first end fixed to the actuator and a second end disposed in the cylinder and in contact with the fluid, the piston configured to remain stationary relative to movement of the cylinder.

12. The control valve of claim 11, wherein the position monitoring system comprises a pressure sensor configured to generate the signal.

13. The control valve of claim 11, wherein the position monitoring system comprises a pressure sensor that is sensitive to pressure changes on a scale of mmWC/mbar.

14. The control valve of claim 11, further comprising:

a sensor coupled with the second end of the tube; and a controller with operating hardware coupled with the sensor, the operating hardware configured to process the signal to generate a value for an operating condition of the valve.

15. The control valve of claim 11, further comprising:

a sensor coupled with the second end of the tube; and a controller with operating hardware coupled with the sensor, the operating hardware configured to process the signal to generate a value for an operating condition of the valve, wherein the value accounts for conditions around the sensor.

16. The control valve of claim 11, further comprising:

a sensor coupled with the second end of the tube; and a controller with operating hardware coupled with the sensor, the operating hardware configured to process the signal to generate a value for an operating condition of the valve, wherein the value accounts for ambient temperature.

17. The control valve of claim 11, further comprising:

a sensor coupled with the second end of the tube; and a controller with operating hardware coupled with the pressure sensor, the operating hardware configured to process the signal to generate a value for an operating condition of the valve, wherein the value accounts ambient pressure.

18. The control valve of claim 11, further comprising:

a sensor coupled with the second end of the tube, wherein the tube bends at a lower portion proximate the second end.

19. The control valve of claim 11, further comprising:

a sensor coupled with the second end of the tube, wherein the tube is flexible to accommodate a bend radius proximate the second end.

20. The control valve of claim 11, wherein the fluid comprises synthetic oil.

\* \* \* \* \*